(12) United States Patent
Mendes (10) Patent No.: US 8,557,121 B1
(45) Date of Patent: Oct. 15, 2013

(54) MODULAR SYSTEMS AND METHODS FOR COLLECTING AND CONTAINING OIL SPILLS

(71) Applicant: Joseph B. Mendes, Homestead, FL (US)

(72) Inventor: Joseph B. Mendes, Homestead, FL (US)

(73) Assignees: Joseph B Mendes, Homestead, FL (US); Victor Ugolyn, Ridgefield, CT (US); Jack Clair, Esq., Longmeadow, MA (US)

( * ) Notice: Subject to any disclaimer, the term of this patent is extended or adjusted under 35 U.S.C. 154(b) by 0 days.

(21) Appl. No.: 13/625,205

(22) Filed: Sep. 24, 2012

(51) Int. Cl.
*E02B 15/10* (2006.01)
*C02F 1/40* (2006.01)

(52) U.S. Cl.
CPC ............ *E02B 15/101* (2013.01); *Y10S 210/924* (2013.01)
USPC ........ 210/693; 210/242.4; 210/330; 210/359; 210/456; 210/484; 210/485; 210/502.1; 210/747.6; 210/924

(58) Field of Classification Search
CPC .................................................... E02B 15/101
USPC ............. 210/242.4, 693, 924, 330, 359, 456, 210/484, 485, 502.1, 747.6
See application file for complete search history.

(56) References Cited

U.S. PATENT DOCUMENTS

| | | | | |
|---|---|---|---|---|
| 3,702,657 A | * | 11/1972 | Cunningham et al. | 210/242.4 |
| 3,739,913 A | * | 6/1973 | Bogosian | 210/242.4 |
| 4,070,287 A | * | 1/1978 | Wiegand et al. | 210/679 |
| 2007/0084414 A1 | * | 4/2007 | Frisbee | 119/474 |

* cited by examiner

*Primary Examiner* — Matthew O Savage
(74) *Attorney, Agent, or Firm* — Carol Marmo; Eckert Seamans Cherin & Mellot (57) ABSTRACT

A system and method for capturing ecologically harmful substances in the nature of hydrocarbons from the surface of a body of water or from the ground adjacent a landfill or waste dump or from a shoreline of a body of water into which residual waste fluids from an adjacent ground leakage is passed. The system and method including a plurality of modular traps. The traps having a side, end, top and bottom panels constructed of a material that allows fluid flow therethrough.

8 Claims, 11 Drawing Sheets

MODULAR SYSTEMS AND METHODS FOR COLLECTING AND CONTAINING OIL SPILLS

FIELD OF THE INVENTION

This invention relates to pollution control systems and methods for collecting and containing hydrocarbons spilled in a body of water or leaking from a landfill or waste dump or underground storage tank, and are particularly applicable for minimizing the catastrophic effects from spreading of a spillage or leakage.

The systems and methods are particularly useful for the collection of residual waste fluids generated by a leaking storage facility or a landfill or waste dump and for reducing the spread of a plume of subsurface contaminants for the purpose of preventing the pollution of storm water drainage, sewer systems, or ground water supplies with ecologically harmful substances.

BACKGROUND

There is an increasing concern over the need to economically and practically remove oil from water. Oil spills on water are usually the result of accidents occurring during the production and distribution of oil and its derivatives. Most such accidents involve ship loading and unloading, groundings, collisions, offshore drilling blowouts, and pipe fractures. Spillages in or on water, resulting from oil drilling operations at sea or whilst oil is being transported over the sea, shipwrecks and harbor pollution, are sources of the spew of oil into the water wherefore hydrocarbons, immiscible with and lighter than water, commingle with the water body. Invariably, in the case of oil spills, whether at sea or on a river or lake, the oil is driven toward or along the coastline, by wind and/or wave actions or other currants so that it is obviously essential that the same be contained, preferably before washing up at the shoreline.

Spillages from inground installations, such as storage tanks, waste dumps or landfills, are invariably the result of carelessness on the part of personnel making thoughtless or wasteful facility usage. In the case of leakage from a landfill, a waste dump or a storage tank, there is the need for hazardous waste containment and especially a method for preventing, for example, the migration and leaching of hazardous fluid substances into a water table.

Therefore, it is desired to design and develop an oil-recovery system that will (i) permit quick response to a problem, (ii) perforin good in bad conditions, such as rough water or nearness to obstacles, (iii) contain the extent of the oil spill quickly, (iv) permit easy deployment, and (v) allow for efficient and effective collection.

SUMMARY OF THE INVENTION

In one aspect, the invention provides a modular, oil skimming system to reduce or minimize the effects of a spreading of a spillage or leakage of liquid hydrocarbons on a body of water. The system includes a plurality of traps suited for end-to-end disposition upon a body of water. Each of the plurality of traps has a box-like configuration and a top panel, a bottom panel, side panels and end panels. The panels are constructed to allow the flow of fluid therethrough. The system further includes an oil sorbent material disposed within each of the plurality of traps, a flexible rope-like material for connecting and holding together the plurality of traps in a series and for allowing the towing of the plurality of traps in the series by the rope-like material, and a deflector assembly disposed between two adjacent traps of the plurality of traps. The oil sorbent material includes bonded polymeric fibers and the deflector assembly is capable to minimize fluid flow in a space between the adjacent traps.

In another aspect, the invention provides a method of reducing or minimizing the effects of a spreading of a spillage or leakage of liquid hydrocarbons on a body of water. The method includes obtaining a plurality of modular traps. Each of the plurality of traps includes a box-like configuration having a top panel, a bottom panel, side panels and end panels. The panels are constructed to allow the flow of fluid therethrough. The traps further include an oil sorbent material disposed within each of the plurality of traps. The oil sorbent material includes bonded polymeric fibers. The method further includes arranging the plurality of modular traps in a series, connecting together the plurality of modular traps using a rope-like material having a first end and a second end. The first end is connected to one of the plurality of modular traps and the second end is connected to an adjacent one of the plurality of modular traps. The connecting together allows towing of the plurality of traps in the series by the rope-like material. The method further includes minimizing the fluid flow between the plurality of traps using a deflector assembly having a first side and a second side, the first side connected to one of the plurality of modular traps and the second side connected to an adjacent one of the plurality of modular traps.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention includes an oil skimming system for minimizing the effects of a spreading of a spillage or leakage of liquid hydrocarbons on a body of water. The system includes a flow-through pollution trap or barricade or oil trap module for the control and removal of oil spills in a water environment or in a land area sustaining leakage from a landfill or waste dump or underground storage tank.

As defined herein and the claims, the term "oil spills" means any undesired discharge of a petroleum product on a body of open water or any spillage or leakage from a landfill or waste dump or storage tank. The use of the term "sorbent material" herein and the claims means a material with the capacity to absorb or adsorb oil.

As defined herein and the claims, the term "hydrocarbons" or "oils" refers to a plurality of liquid hydrocarbons, including but not limited to, gasoline, kerosenes, light and heavy oils, jet fuel, petroleum, asphalt and paraffin crudes, diesel oil, naphtha, water-immiscible ketones, aromatic solvents such as benzene, toluene and xylene, terpenes, esters, phenols, aldehydes, amides, amines, mercaptans, fatty acids, fatty acid esters, halohydrocarbons, polar organic compounds, and the like.

In general, the invention includes a box-like trap arrangement having top, bottom, side and end panels. The panels are constructed so as to allow the flow of fluids there-in, through and out. Suitable materials include an open mesh-type material. A fibrous oil sorbent material consisting of a synthetic polymer, such as polyolefin, in the form of a hydrophobic oleophilic fibrous material is contained within the interior of the trap. In certain embodiments, the invention includes the utilization of one or more traps of the pass-through type which allows the flow of fluids into the traps from which the hydrocarbons can be removed (e.g., and contained in the oil sorbent material) whilst allowing the flow through of the other fluids. In certain embodiments, the invention includes an individual trap or module. In other embodiments, the invention includes a series of connected-together traps or modules, the trap or series being of a length or width adequate for satisfactorily confronting the dimensions of an area in which a particular spillage has occurred.

The trap can be floated upon a water body or entrenched along an adjacent shoreline or augured in soil, in any case, surrounding an area to be contained, restricted or protected. The terms "contained" or "restricted" area as used herein are interchangeable and defined by the building of a completely surrounding barrier wall, surrounding the area 360°, or by the building of an appropriate restriction wall of less than 360° coverage which effectively contains the restricted area, taking into account the direction or directions of flow and the contaminated fluids. In certain embodiments, the invention includes trenching and auguring in the soil surrounding the area to be contained, restricted or protected, preferably to an underlying impermeable strata, for the installation of interconnected traps so as to produce an in-ground containment or restriction wall.

The invention can further include an oil collection trap or a floatable series of interconnected traps oriented to capture the floating oil slick and to channel the same towards the traps by the progressive approach of the traps to the oil slick or of the oil slick to the traps, so as to entrain the threshold of the oil and water flowing into the traps and then to capture the oil, while releasing and exiting therefrom the oil-free water.

Additionally, the invention includes capturing any hydrocarbon contaminants in a contaminated plume leading from a leaking underground storage tank or dump or landfill with the trap or traps being positioned substantially perpendicular to the plume incident thereto. That is, an in-ground containment wall comprising a plurality of engaged, interlocked, vertical pass-through traps installed in the ground and through which the controlled removal of the contained hydrocarbons and other materials from the contained or restricted area is attained and treated.

Figure 1A:
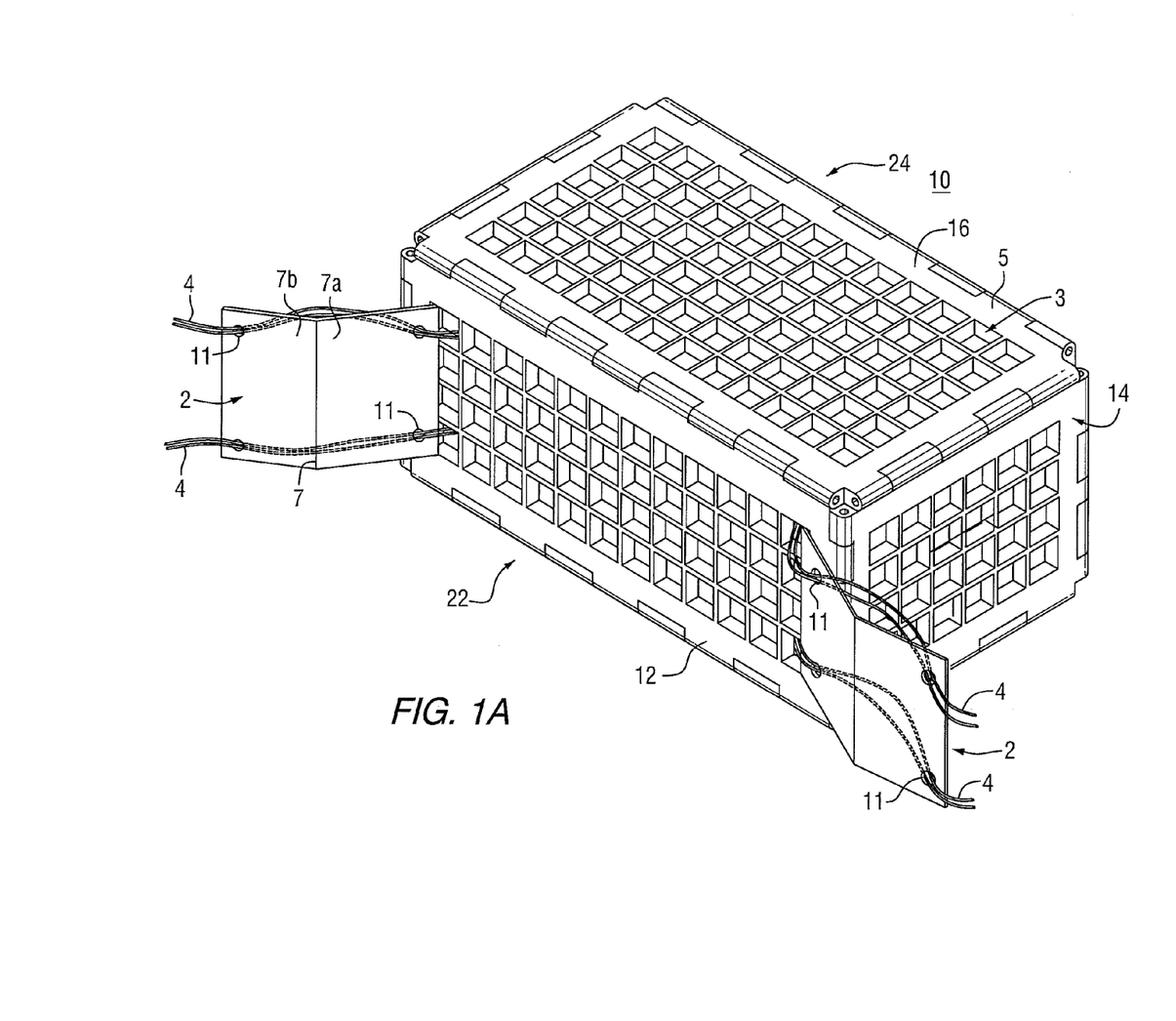
FIG. 1A is isometric view of the trap or barrier, in accordance with certain embodiments of the invention.

FIG. 1A shows a trap or barrier in accordance with certain embodiments of the invention. In FIG. 1A, a rectangular or box-shaped sieve-like trap or module 10 is formed by front and rear side panels 12, end panels 14, a top panel 16, and a bottom panel 18. In FIG. 1A, each of these panels includes an outer peripheral framework 5 which supports a lattice 3 formed of intersecting (e.g., criss-crossed) slats. It is contemplated and understood that the panels 12, 14, 16, 18 can include various configurations that define an area of openness to permit the free and easy entry of fluid into, through and out of the trap 10 while being capable of supporting an oil sorbent material (not shown) within the interior of the trap 10. Further, the trap 10 includes two external deflector assemblies 2. As shown in FIG. 1A, each of the external deflector assemblies 2 is mounted on opposite ends of an outer surface of the front panel 12. The external deflector assemblies 2 can be mounted using various conventional mechanisms known in the art. The external deflector assemblies 2 are shown in FIG. 1A as angled about a longitudinal axis 7, but they may be designed in various configurations, such as flat or cupped. The external deflector assemblies 2 can be angled at various pitches to maximize efficiency in differing current or towing velocities. One side 7a is mounted to the front panel 12 and the other side 7b is mounted to another trap (not shown) which is positioned next to trap 10, e.g., in series. Thus, each pair of adjacent traps is provided with one of the external deflector assemblies 2 extending between the confronting side panels. The external deflector assemblies 2 face the spillage being confronted and are capable of directing the flow into the adjacent traps. Further, the external deflector assemblies 2 close off the space between the adjacent traps and are capable to minimize or prevent the flow of liquid therethrough. The external deflector assemblies 2 can be constructed of a variety of materials that are liquid impervious.

Figure 1B:
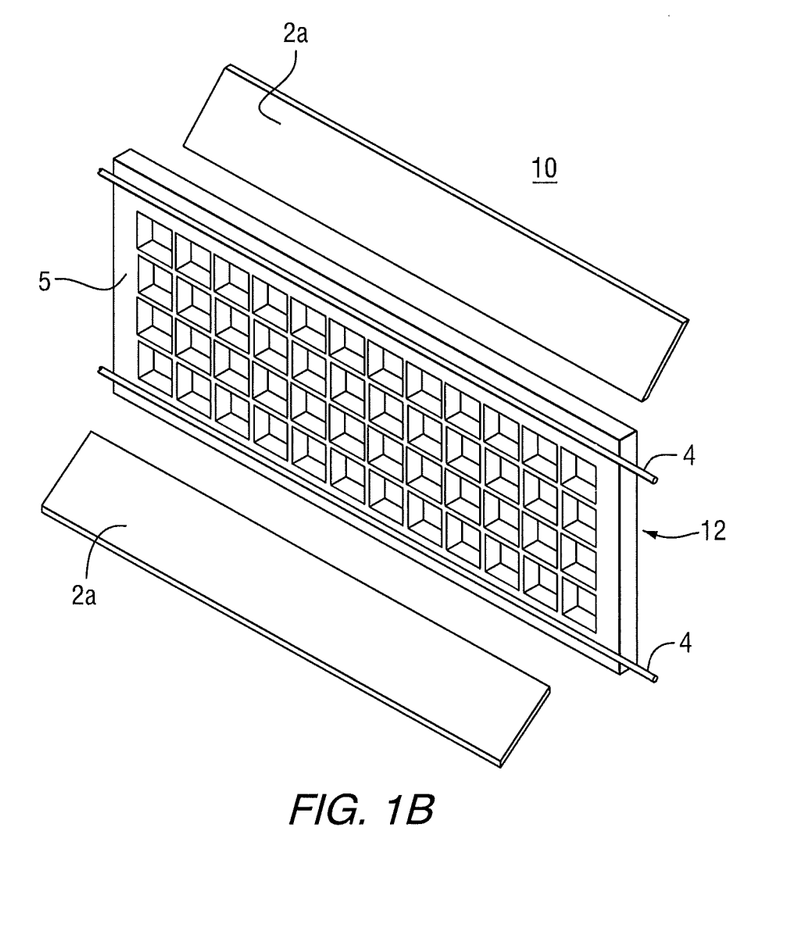
FIG. 1B is an isometric view of the front side panel of the trap or barrier in FIG. 1A including internal deflector assemblies, in accordance with certain embodiments of the invention.
Figure 1C:
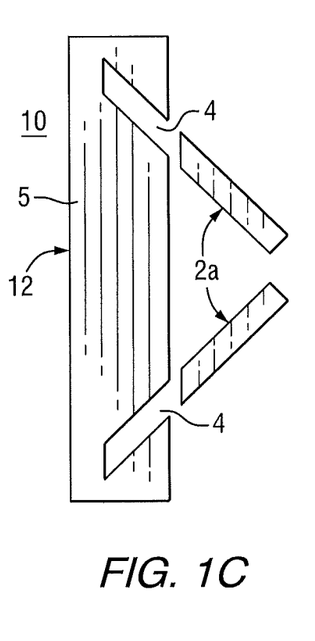
FIG. 1C is a side view of the internal deflector assemblies of FIG. 1B, in accordance with certain embodiments of the invention.

FIG. 1B shows the trap 10 as shown in FIG. 1A with internal deflector assemblies 2a. The internal deflector assemblies 2a are positioned in the interior of the trap 10 and capable of directing fluid flow therein. As shown in FIG. 1B, the internal deflector assemblies 2a are mounted on opposite longitudinal sides of the framework 5 of the inner surface of the front panel 12. It is contemplated and understood that the internal deflector assemblies 2a can also be mounted on the inner surface of the rear panel 12 and/or the side panels 14. Thus, the interior of the trap 10 can include internal defector assemblies 2a on one or more of the panels 12,14. The internal deflector assemblies 2a can be constructed of material similar to that above-described for the external deflector assemblies 2, e.g., a liquid impervious membrane or material. In certain embodiments, the internal deflector assemblies 2a are constructed of a liquid impervious, inflexible plastic material. The internal deflector assemblies 2a can be mounted using various conventional techniques known in the art. FIG. 1C is a side view of the front panel 12 in FIG. 1B. As shown in FIG. 1C, slits 4 are cut into the framework 5 of the inner surface of the front panel 12 of the trap 10. The slits 4 can be formed using a variety of conventional machining techniques known in the art. The internal deflector assemblies 2a can be sized to fit in or connect to the slits 4. The slits 4 can be formed so that the internal deflector assembles 2a are disposed at varying angles. In certain embodiments, the slits are formed such that the internal deflector assemblies 2a are positioned at a 45 degree angle based on the panel 12 to which it is mounted.

Furthermore, trap 10 shown in FIG. 1A includes ropes 4 attached thereto. The ropes 4 can be constructed of various flexible, rope or rope-like materials that are known in the art. The ropes 4 are effective to connect in series trap 10 to additional traps (not shown) located on each side of trap 10. The ropes 4 can be connected to and/or through trap 10 and the other traps (not shown) using various conventional coupling mechanisms. In FIG. 1A, two of the ropes 4 are attached on one end of the front panel 12, one at the top and the other opposite thereto on the bottom, and two of the ropes 4 are attached on the other end of the front panel 12. Thus, one end of each of the ropes 4 is attached to the trap 10 and the other end of each of the ropes 4 is attached to the other traps (not shown). Moreover, each of the ropes 4 passes through openings 11 which are formed in sides 7a and 7b of each of the external deflector assemblies 2. In certain embodiments, the openings 11 in side 7a can align with the lattice 3 of front panel 12 such that the ropes 4 can run longitudinally through the trap 10 or the ropes 4 can be knotted or tied through the openings 11 and lattice 3. The openings 11 can be formed using various conventional mechanisms known in the art. In certain embodiments, the openings 11 include a through stud with a ring mount.

The ropes 4 may be of a single length or a plurality of lengths joined together and passable through the traps in the case of a series of traps positioned in an end-to-end relationship. The ropes 4 serve to connect and to hold together the traps of the series and to allow the towing of the trap series by the rope ends or to permit anchoring of the series by the staking of the rope at each of its ends.

Thus, in the invention, a series of traps can be "hingedly" connected to each other in a train-like arrangement with ropes running longitudinally between and/or through the interconnected units with each opposite end attached to a tow craft for towing the U-shaped arrangement into the waterborne oil slick.

The ropes between adjacent traps provide an allowable pivotal relationship between adjacent traps, one trap being allowed a freedom of motion relative to its next adjacent trap. That is, there is a pseudo universal joint arrangement between traps so as to allow a sufficient degree of flexibility in responding to wave or current imposed orientations without excessive flexural stressing.

The traps or modules are expressly designed and configured to withstand the stresses associated with towing an interconnected series.

The trap may be constructed of metal, wood, or any other nonmetallic materials such as any engineered plastic compound.

For purposes of orientation, the front or forward side or bow of the trap is delineated as 22 in FIG. 1A. With the rear or rearward or stern side being delineated as 24. In operational use, the trap will normally be positioned so that the bow confronts the spillage to be entrapped.

The trap dimensions may vary, and can depend on one or more of the following considerations: the nature of the spillage problem being contained, the area of exposure, and the quantity of sorbent material necessary in accordance with a particular usage.

Figure 2A:
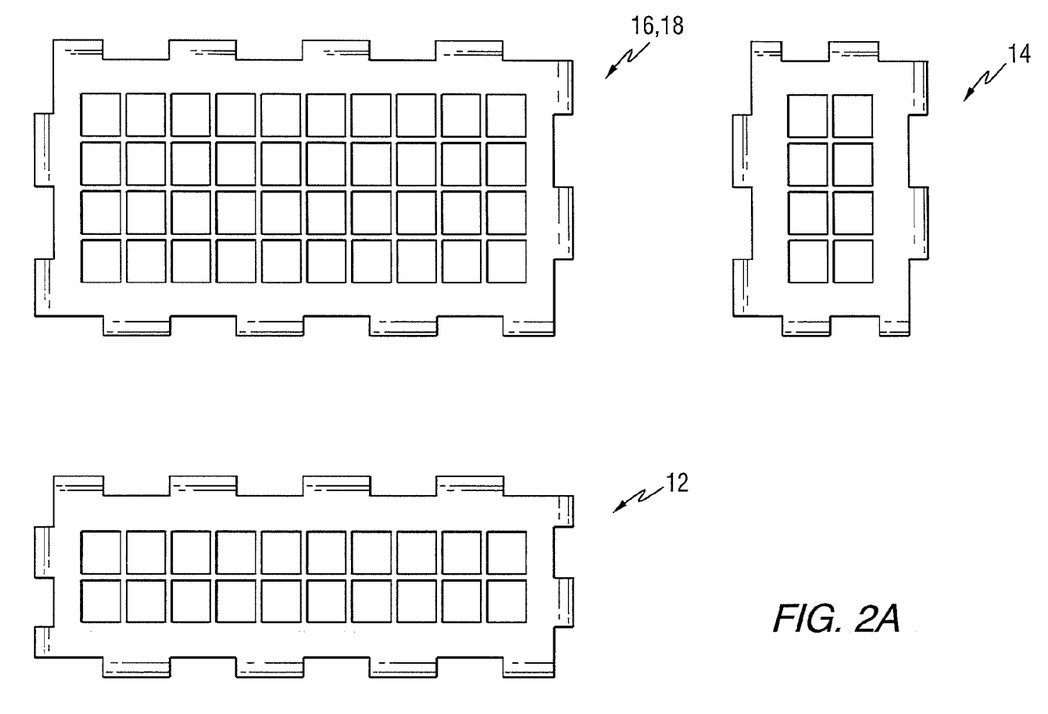
FIG. 2A is an isometric view of the modular panels of the trap or barrier, in accordance with certain embodiments of the invention.
Figure 2B:
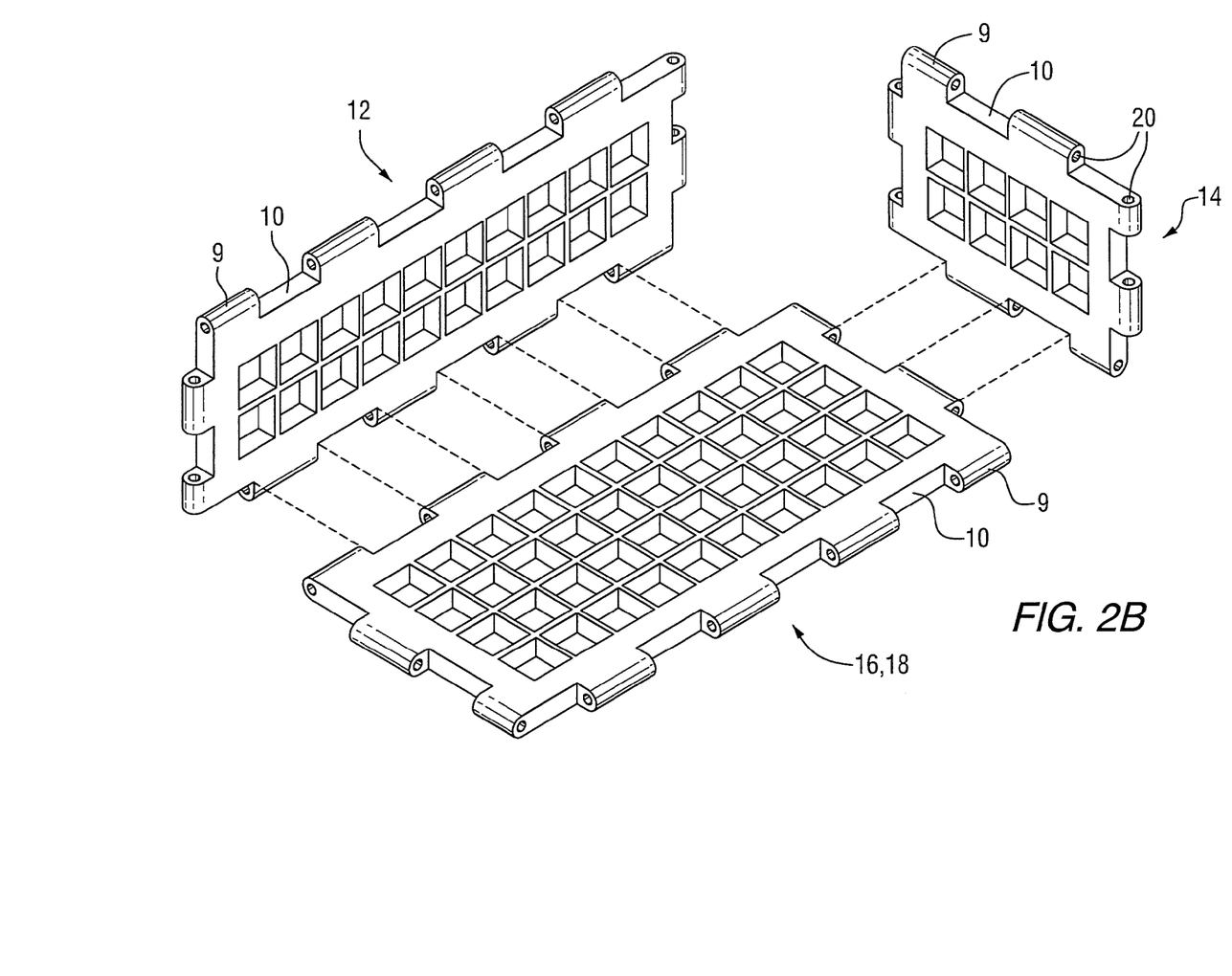
FIG. 2B is an isometric view of the modular panels of FIG. 2A being joined together to form the trap or barrier, in accordance with certain embodiments of the invention.

To facilitate storage, transportation and deployment, the trap 10 shown in FIG. 1A is designed to include a modular frame. FIG. 2A shows the front and rear side panels 12, end panels 14, top panel 16 and bottom panel 18 of FIG. 1A as individual pieces or panels separated from one another. FIG. 2B, shows that the individual pieces or panels of 12, 14, 16 and 18 are joined or fitted together to form the trap 10 of the invention. The mechanism to join or fit together the individual panels 12, 14, 16 and 18 can include a variety of fastener mechanisms known in the art, such as but not limited to tongue and groove configurations, tab and detent/indent configurations, male and female connectors, pin/dowel and aperture configurations, and the like. In FIG. 2B, the panels 12, 14, 16 and 18 include a plurality of tabs 9 and indents 10 disposed thereon the outer edges. Each of the tabs 9 on one panel can be fitted into each of the indents 10 on another panel to connect the panels together. When joined or fitted together, the trap 10 becomes rigid along its planes. Further, in certain embodiments, each of the tabs 9 may further include a pin or dowel (not shown) formed on each side which can be inserted into an aperture 20 formed on opposite ends of each of the indents 10 to provide an enhanced connection.

Figure 3:
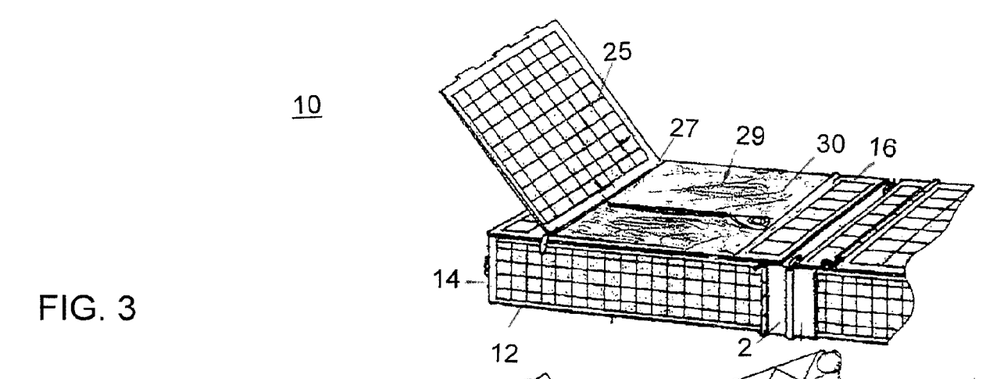
FIG. 3 is a side view of the trap or barrier with an oil absorbent material contained therein, in accordance with an embodiment of the invention.

FIG. 3 shows the trap 10 of FIG. 1A including the front panel 12, the end panels 14, the top panel 16, and one of the external deflector assemblies 2. In addition, FIG. 3 includes a section 25 which is a partial cut-out of the top panel 16. The section 25 is connected to a portion of the top panel 16 by a hinge-like mechanism 27 to form a door-like configuration. When pulled up and away from the top panel 16, section 25 provides access to the interior 29 of the trap 10. An oil sorbent material 30 is contained in the interior 29. The oil sorbent material 30 can be inserted and or extracted through the opening formed by section 25. It is contemplated and understood that equivalent configurations may be substituted therefore to allow the changing of the oil sorbent material 30 in the trap 10.

Figure 4:
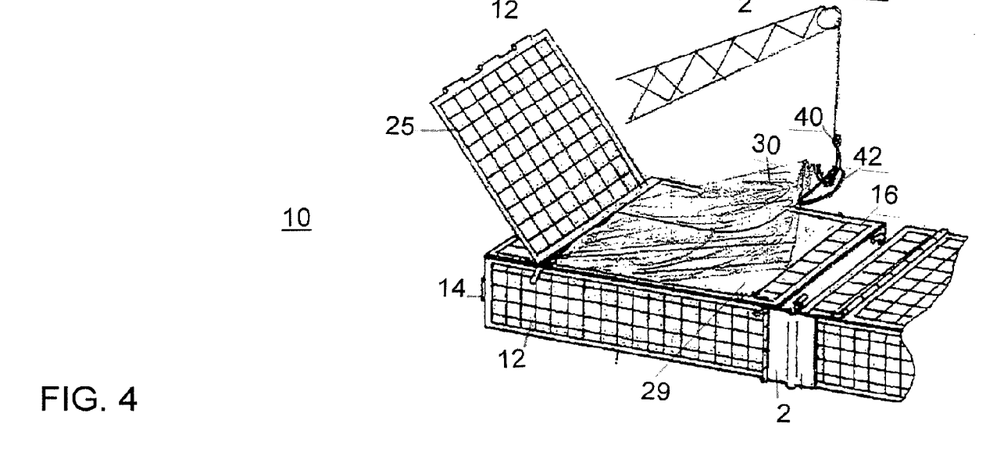
FIG. 4 is a side view of the trap or barrier with a hook mechanism in association therewith for removing the oil absorbent material, in accordance with an embodiment of the invention.

FIG. 4 shows the trap 10 of FIG. 3 and further includes a hook 40 and a loop 42 mounted on a side edge of the oil sorbent material 30. The hook 40 engages the loop 42 and as a result grabs and lifts the oil sorbent material 30 extracting it from the trap 10 through the opening formed by section 25 in the top panel 16. This provides a quick and effective means of removing the oil sorbent material 30 from the interior 29 of the trap 10. It is contemplated and understood that the size of the mechanism (e.g., hook 40) used to extract the oil sorbent material 30 from the trap 10 can depend on the size and weight of the oil sorbent material 30. In certain embodiments, wherein the oil sorbent material 30 is smaller and lighter in weight, manual extraction may be employed. However, wherein the oil sorbent material 30 is larger and heavier, a mechanical means may be employed for extraction purposes. Further, depending on the dimensions of the oil sorbent material 30 and the means employed for extraction, there may be present more than one loop 42 mounted thereon to assist in the grabbing and lifting the oil sorbent material 30.

The oil absorbent material 30 is constructed of a material which is capable of allowing water to pass freely therethrough while remaining oil wet (oleophilic) when contacted by an oil-water mixture. Not all materials are useful for the purpose hereof, that of providing an effective flow through barrier, but it has been observed that a large variety of fiber-forming materials will function within the scope of the invention.

Sorbent materials suitable for use are those having a cellular structure sufficiently open to allow water to pass freely and yet remain oil wet or oleophilic when contacted by an oil-water mixture so as to adsorb or absorb the oil products encountered. Non-limiting examples of suitable sorbent materials include polymeric materials which exhibit the above-described properties, such as polyolefin. The oil sorbent material 30 may be in various forms of bonded polymeric fibers. For example, the oil sorbent material 30 can be in the form of a sheet, mat, cassette or framework containing polymeric fibers. The polymeric fibers may be combined into a bonded mat-like structure by any known process, for example, such as disclosed in U.S. Pat. No. 2,746,895, so as to define a mass of entangled filaments having large numbers of interconnected interstitial voids and into which oil is received and retained substantially to the exclusion of water. The oil sorbent material, when immersed in an oil-water mixture, allows the oil to displace water from a surface thereof. That is, it is wetted by oil to the extent that water is rejected from the internal voids, while oil is retained.

A variety of binders can be used in producing the oil sorbent material 30. Suitable binders include those that are not deleteriously affected by water or hydrocarbons and can include thermoset binders, such as phenols, melamines and mixtures thereof.

Dependent on the length and amount of polymeric fibers employed, sufficient entanglement may be achieved to necessitate usage of only a small amount of binder to prevent a sift out of the shorter fibers.

In certain embodiments, the oil sorbent material 30 is in the form of a cassette. The cassette includes a composite or stack having a plurality of polymeric sheets. The polymeric sheets are placed or layered on top of one another. The number of sheets can vary. In one embodiment, the number of sheets is from about 4 to about 7. The sheets can be loose or connected or adhered together and typically each of the sheets has the same or similar dimensions so as to form a substantially uniform stack. In one embodiment the sheets are sewn together along at least one edge of the sheets.

The barrier containment pass-through walls allow the controlled removal of the contaminants by passage into and capture within the barrier-like configuration, which barrier can be floated upon the water body or entrenched along an adjacent shoreline or augured in the soil, in any case surrounding the area to be contained, restricted or protected.

Any slight negative buoyancy of the trap structure is offset by the buoyant nature of the oleophylic material contained therewithin.

Normally, the hydrocarbons will float as a film or single interfacial layer or slick upon the water or in a multi-interfacial system having plural discrete interfaces, as in the case of an emulsion.

Efforts to separate the hydrocarbons from the water may be complicated by a reduced thickness of the oil film which is formed around wave action.

Figure 5:
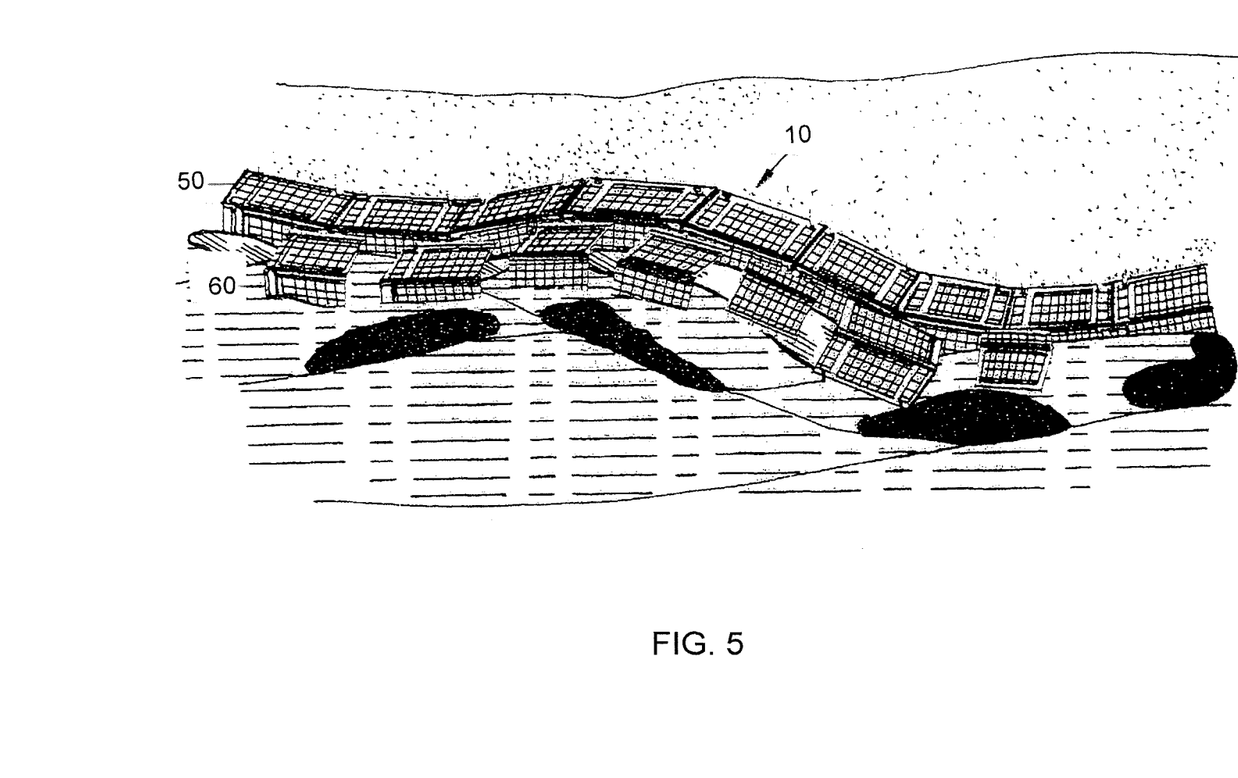
FIG. 5 is a fragmentary isometric view of tiers of traps interconnected in series, in accordance with an embodiment of the invention.

While the traps are usually arranged hi a single serial array, they can be arranged in a staged arrangement, such as a three stage arrangement shown in FIG. 5. In FIG. 5, there is a first single serial array 50 of traps 10 and positioned behind or on the stern side is a second row 60 of traps 10. Each of the traps in the second row 60 is positioned between two of the traps 10 that are adjacent to one another in the first single serial array 50. In this arrangement, each of the traps 10 in the second row 60 is capable to receive fluid that may flow through the space or passage located between two of the traps 10 which are adjacent to each other in the first single serial array 50.

Figure 6:
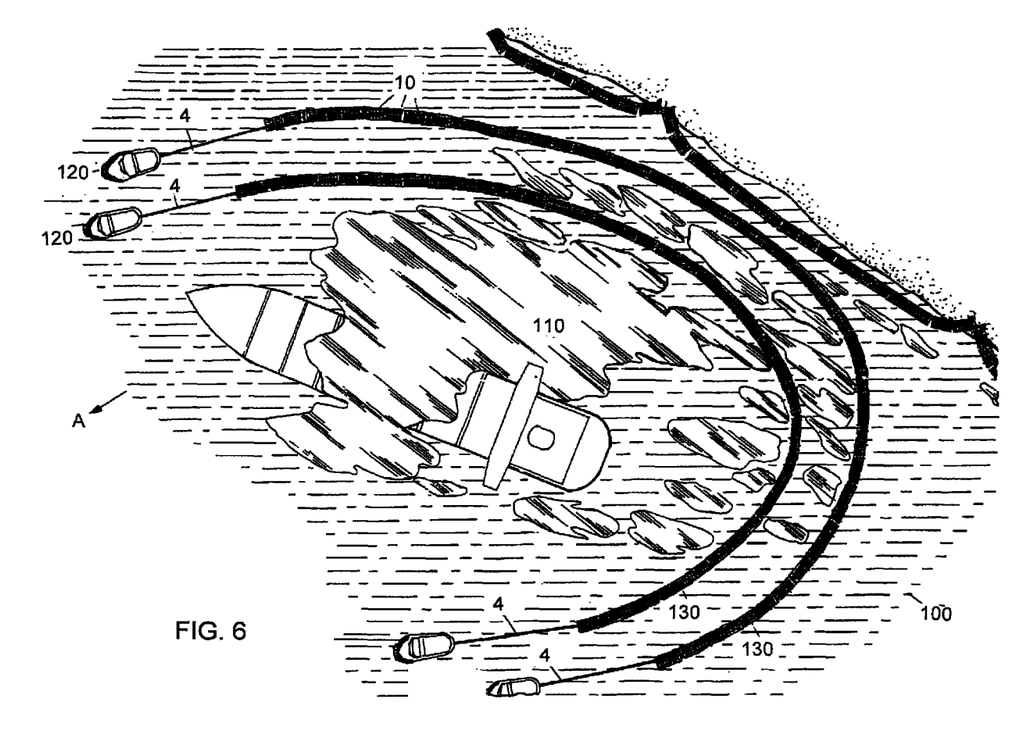
FIG. 6 is a small scale isometric view of a pair of series of traps in the towing position relative to an oil spill and of a trio of series of traps anchored at a shoreline, in accordance with an embodiment of the invention.

FIG. 6 shows a pair 160 of series-connected traps each consisting of a plurality of interconnected traps 10 and each arranged in a semi-circular confrontation in a body of water 100 surrounding an oil spill 110. The traps 10 are maintained in position by the ropes 4 (as shown in FIG. 1A) which connect the interconnected traps 10 of the series to tug boats 120 at opposite ends of the series, with the tug boats 120 moving in the direction indicated by arrows A.

The ropes float on the water and provide a quick disconnect system. For example, each of the ropes 4 (shown in FIG. 1A) can be cut or disconnected from one of the external deflector assemblies 2 (shown in FIG. 1A) so that a single trap 10 can be easily removed from a serial array of traps.

Figure 7:
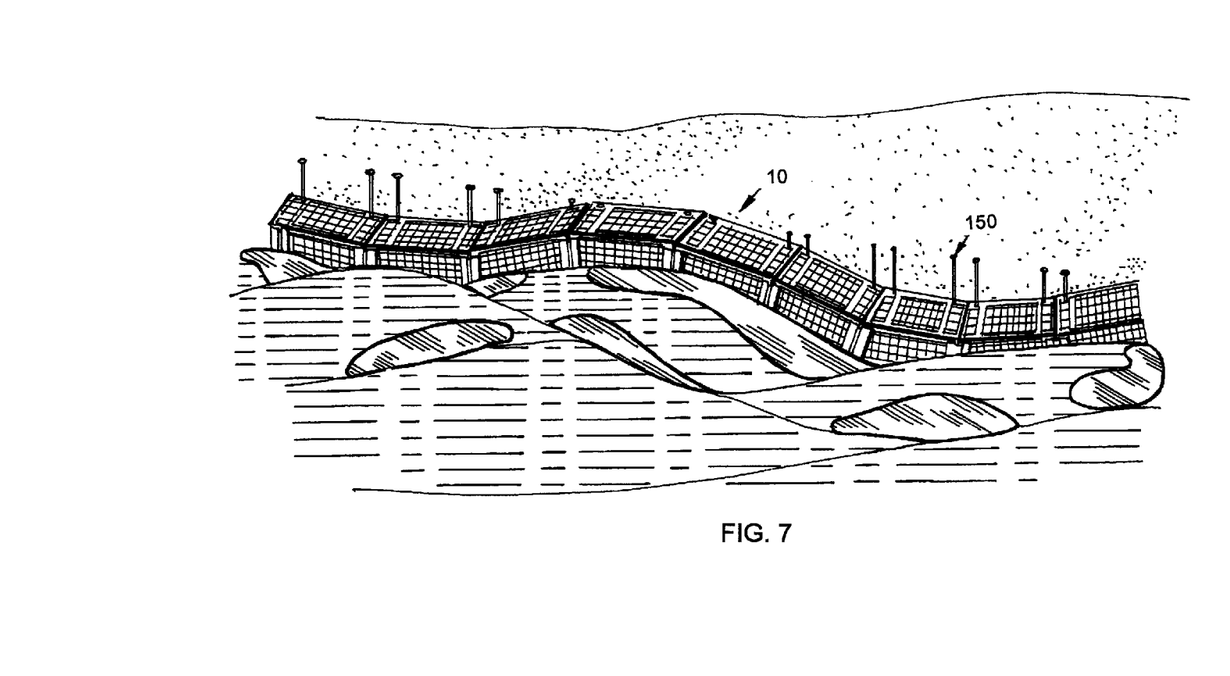
FIG. 7 is a fragmentary isometric view of a series of interconnected traps anchored along a shoreline, in accordance with an embodiment of the invention.

In FIG. 7, an arrangement of a series of traps 10 are tied at their opposite ends by virtue of anchoring the ropes 4 (shown in FIGS. 1A and 6) with an anchoring mechanism 150 relative to the configuration of a shoreline so as to preclude the oil spill arriving from the open sea from reaching part of the shoreline, be it a beach, harbor, port or the like, and for confining the hydrocarbons which may have escaped from an oil tanker which may have sustained an accident to a limited area.

It is to be understood that the interconnected system of traps can be installed in any water environment operational area to provide a cleaning factor against any oil spill hazard present.

Conceivably, the barrier could be established in situ prior to any potential need.

The dragging of the trap through the water assists in the creation of a churning or oscillating motion within the trap, the agitation increasing the action of the media so as to enhance its absorbency effectiveness.

Figure 8:
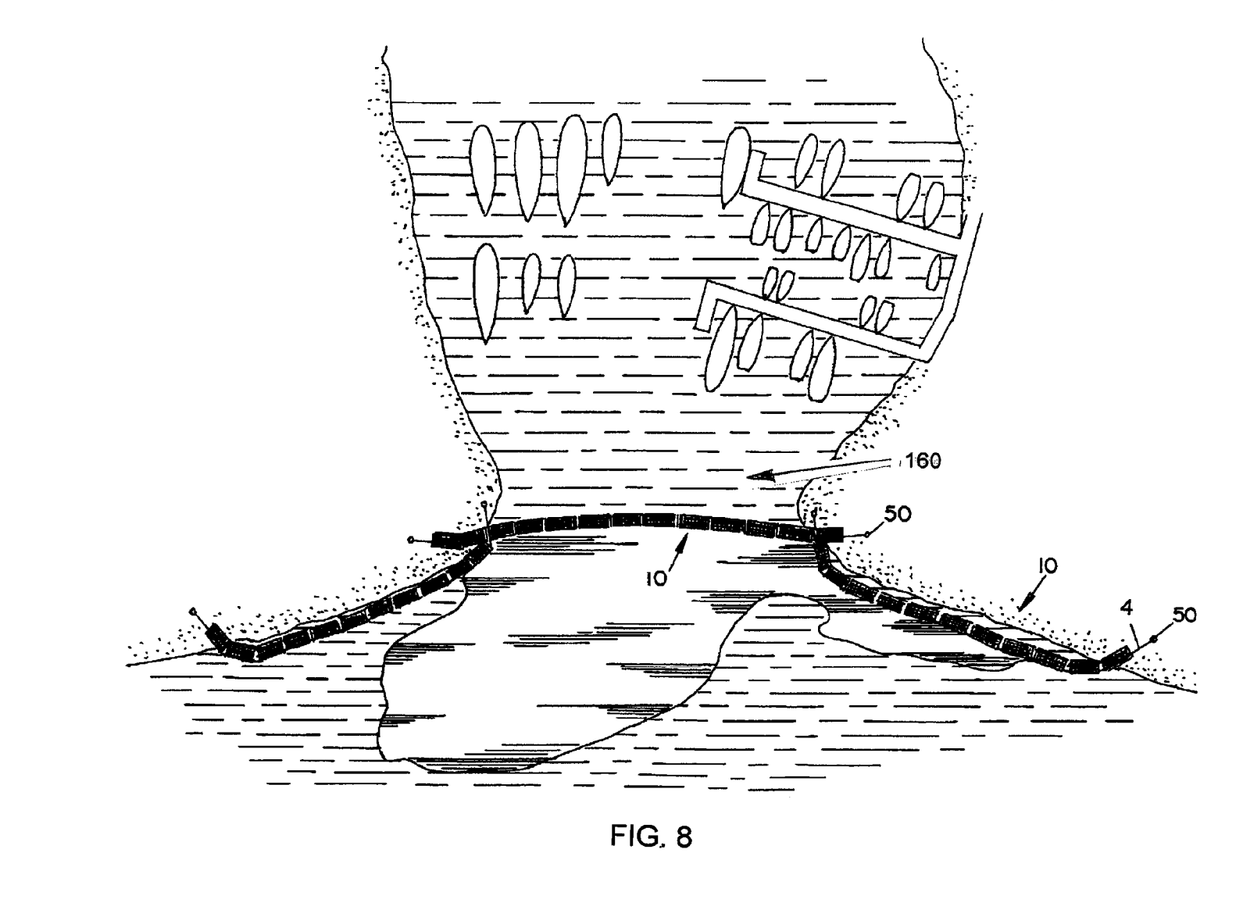
FIG. 8 is a small scale schematic view showing a series of traps in blocking position relative to an inlet, in accordance with an embodiment of the invention.

FIG. 8 shows a series of traps 10 in a blocking position relative to an inlet 160.

In this, as in all exemplifications herein, it is observed that the traps can be towed to and through an oil slick or positioned stationarily along a shoreline or across an inlet or the like, for trapping the petroleum hydrocarbons while cleaned water passes through and exits the device.

Figure 9:
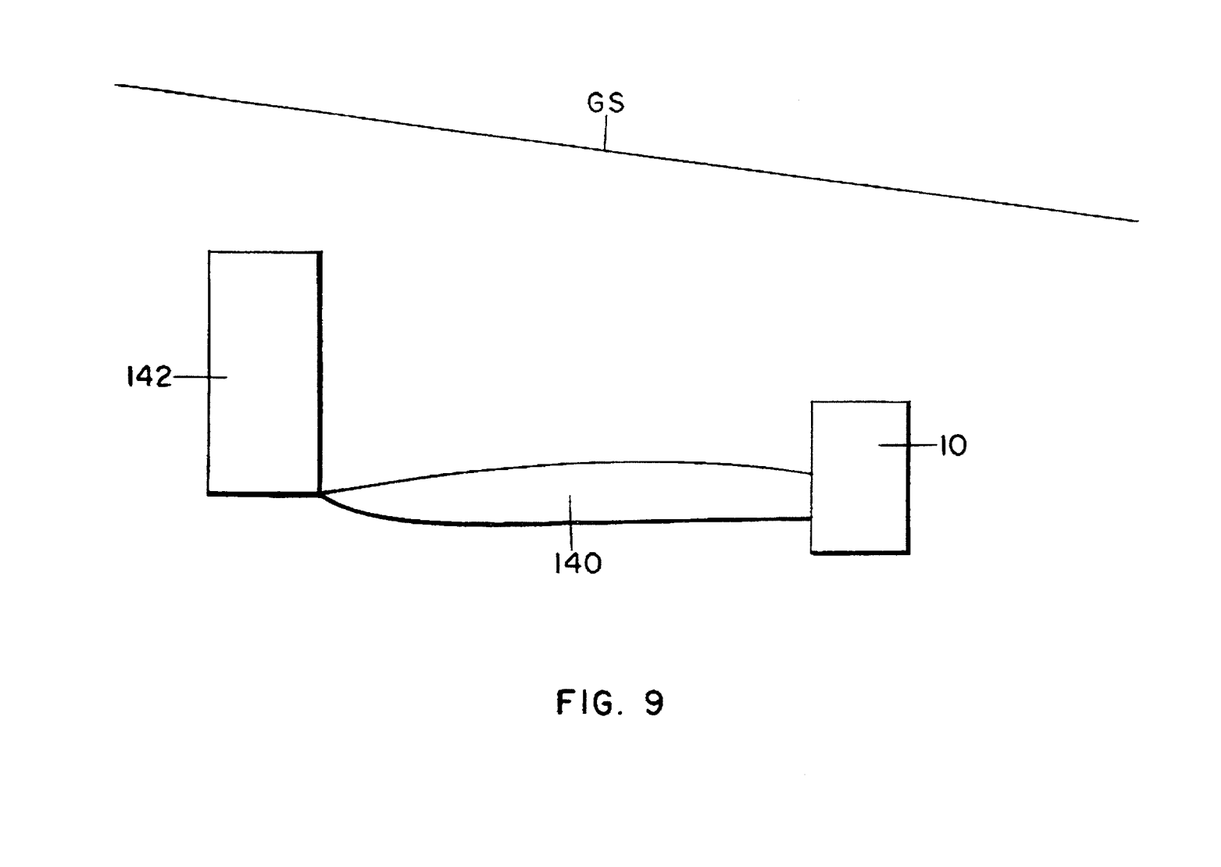
FIG. 9 is a block diagram showing the leakage from an underground storage tank, a containment plume, and a strategically located barrier, in accordance with an embodiment of the invention.

FIG. 9 is a block diagram which shows the containment plume or aquifer or leakage 140 from a storage tank 142 below the ground surface GS with a trap 10 strategically located so as to capture the leaking contaminants. The trap or barrier serves to reduce the spread of a plume of subsurface contaminants.

The hazardous waste contaminant system hereof is also useful in precluding the lateral migration and leaching of the hazardous fluid substances into a water table, particularly for site located over a fluid impermeable strata of clay or the like, while allowing the flow of same toward and into an adjacent water body such as the ocean, river or lake at the shoreline thereof, and allowing the controlled removal and/or in situ treatment of the fluid substances including the hydrocarbons.

Preparation is made by trenching, auguring or digging a vertical opening or excavation of prescribed depth, width, and/or diameter in the soil or shoreline surrounding the area to be contained, restricted, or protected, down preferably to an underlying impermeable strata, and deploying a series of interconnected barrier members to produce the in-ground containment or restriction wall adjacent the leakage zone.

The system makes use of the aquifer emptying into an adjoining body of water such as a shoreline of an ocean, river, lake or pond, the aquifer being a fluid bearing stratum of permeable rock or sand or gravel along which the hydrocarbons may migrate and leach.

The contaminated waste fluid is passed laterally through the permeable body in a time period, as determined by the permeability of the body, the differential pressures, and the like.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A modular, oil skimming system to reduce or minimize the effects of a spreading of a spillage or leakage of liquid hydrocarbons on a body of water comprising:
   a plurality of traps suited for end-to-end disposition upon a body of water,
   each of the plurality of traps having a top panel, a bottom panel, side panels and end panels, the panels connected to form a cavity therein and the panels being constructed of a material to allow the flow of fluid therethrough;
   an oil sorbent material disposed within each of the plurality of traps, the oil sorbent material comprising bonded polymeric fibers;
   a deflector assembly disposed between two adjacent traps of the plurality of traps, said deflector assembly capable to minimize fluid flow in a space between the adjacent traps; and
   a plurality of flexible ropes extending between each of the two adjacent traps, each of the plurality of flexible ropes having a first end and a second end, the first end being connected to the front panel of one of the two adjacent traps and the second end being connected to the front panel of another of the two adjacent traps, each of the plurality of flexible ropes extending through one or more openings formed in the deflector assembly,
   wherein the plurality of flexible ropes connects and holds together the plurality of traps in a series and allows for the towing of the plurality of traps in the series.

2. The system of claim 1, wherein the oil sorbent material is in a form selected from the group consisting of a mat, sheet, framework and cassette.

3. The system of claim 1, wherein each of the top, bottom, side and end panels are separate, individual pieces which are joined together using a fastener mechanism to form each of the plurality of traps.

4. The system of claim 1, wherein the deflector assembly is constructed such that can be angled about a longitudinal axis.

5. The system of claim 1, wherein the top, bottom, side and end panels are constructed of a mesh material.

6. The system of claim 1, further comprising at least one interior deflector assembly positioned within the interior of each of the plurality of traps.

7. The system of claim 6, wherein the external and internal deflector assemblies are constructed of a flexible, liquid impervious material.

8. A method of reducing or minimizing the effects of a spreading of a spillage or leakage of liquid hydrocarbons on a body of water comprising:
   obtaining a plurality of modular traps, each of the plurality of traps comprising:
      a top panel, a bottom panel, side panels and end panels, the panels connected to form a cavity therein and the panels being constructed of a material to allow the flow of fluid therethrough; and
      an oil sorbent material disposed within each of the plurality of traps, the oil sorbent material comprising bonded polymeric fibers;
   arranging the plurality of modular traps in a series;
   positioning a deflector assembly between each of two adjacent modular traps of the plurality of modular traps, having a first edge and a second edge, the first edge connected to one of the two adjacent modular traps and the second edge connected to another of the two adjacent modular traps, said deflector assembly for minimizing fluid flow in a space between the two adjacent modular traps;
   connecting together each of the two adjacent modular traps of the plurality of modular traps using a plurality of flexible roses, each of the plurality of flexible ropes having a first end and a second end, the first end connected to the front panel of one of the two adjacent modular traps and the second end connected to the front panel of another of the two adjacent modular traps; and
   extending each of the plurality of flexible ropes through one or more openings formed in the deflector assembly,
   wherein the at least one flexible rope connects and holds together the plurality of traps in a series and allows for the towing of the plurality of traps in the series.

* * * * *